(12) United States Patent
Stuntebeck et al.

(10) Patent No.: US 11,067,108 B2
(45) Date of Patent: Jul. 20, 2021

(54) ADJUSTABLE MONUMENT HARD POINT MOUNTING DEVICE

(71) Applicant: The Boeing Company, Chicago, IL (US)

(72) Inventors: Bret Robert Stuntebeck, Bonney Lake, WA (US); Travis Hoang Nguyen, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 16/373,854

(22) Filed: Apr. 3, 2019

(65) Prior Publication Data
US 2020/0318668 A1    Oct. 8, 2020

(51) Int. Cl.
*F16B 5/02*      (2006.01)
*B64F 5/10*      (2017.01)
*B64D 11/02*     (2006.01)
*B64D 11/04*     (2006.01)
*B64D 11/00*     (2006.01)

(52) U.S. Cl.
CPC .............. *F16B 5/0208* (2013.01); *B64F 5/10* (2017.01); *B64D 11/0023* (2013.01); *B64D 11/02* (2013.01); *B64D 11/04* (2013.01)

(58) Field of Classification Search
CPC ....... B64F 5/10; B64D 11/0023; B64D 11/02; B64D 11/04; F16B 5/0208
See application file for complete search history.

(56) References Cited

U.S. PATENT DOCUMENTS

| | | | | |
|---|---|---|---|---|
| 4,456,206 A | * | 6/1984 | Tijssen | B64D 11/00 244/118.5 |
| 5,222,694 A | * | 6/1993 | Smoot | B64C 1/066 244/119 |
| 5,520,357 A | * | 5/1996 | Payne | B61D 45/006 244/118.1 |
| 6,543,956 B2 | * | 4/2003 | Schwarzbich | F16B 5/0233 403/167 |
| 7,374,131 B2 | * | 5/2008 | Tiid | B64D 9/003 244/118.5 |
| 10,696,403 B2 | * | 6/2020 | Payne | F25D 17/06 |
| 2007/0262212 A1 | * | 11/2007 | White | B64D 11/02 248/188.4 |
| 2012/0153080 A1 | * | 6/2012 | Duggar | B64D 11/04 244/118.1 |
| 2016/0288896 A1 | * | 10/2016 | Aske | B64C 1/10 |
| 2019/0031354 A1 | * | 1/2019 | Heidtmann | B64C 1/20 |
| 2020/0130842 A1 | * | 4/2020 | Young | B64D 11/02 |

* cited by examiner

*Primary Examiner* — Anita M King
(74) *Attorney, Agent, or Firm* — Yee & Associates, P.C.

(57) ABSTRACT

An adjustable monument mounting assembly is provided. The assembly comprises a saddle bracket that includes a recessed pocket section with a hole. A threaded adjustable fitting is configured at a first end to fit within the hole in the pocket and is accessible through the pocket. The opposite end of the adjustable fitting is configured to contact a structural mounting point. The adjustable fitting can be rotated within the hole and adjusted to bridge a gap between the saddle bracket and structural mounting point, eliminating the need for a shim. A bolt fits through a center through-hole in the adjustable fitting, allowing the adjustable fitting and bolt couple the saddled bracket to the structural mounting point.

20 Claims, 15 Drawing Sheets

ADJUSTABLE MONUMENT HARD POINT MOUNTING DEVICE

BACKGROUND INFORMATION

1. Field

The present disclosure relates generally to monuments on aircraft and more particularly to an adjustable hard point mounting device for a monument within an aircraft.

2. Background

Generally, a "monument" is a large, replaceable section of an inside of the aircraft designed for a purpose, such as a lavatory, closet, divider, or galley. The monument design scheme allows, for example, a lavatory for a commercial aircraft to be approved by regulators as a whole and then installed in an aircraft.

Monuments are installed by coupling brackets incorporated into the monuments to structural mounting points within the aircraft. However, even when a monument is built within tight tolerances, it is rarely a perfect fit. As a result, there might be small gaps between some of the brackets and the structural mounting points. Such gaps prevent the proper transfer of force between the bracket and mounting point. The resulting uneven distribution of forces through the brackets can produce undesirable mechanical stress on the monument structure.

The gap between a bracket and a mounting point is usually filled with a shim. This requires manually measuring the gap, customizing the shim, and manually installing the shim, which can take half an hour to an hour for each monument.

SUMMARY

An illustrative embodiment provides an adjustable saddle bracket assembly. The assembly comprises a saddle bracket that has a recessed pocket section with a hole. An adjustable fitting comprising a center through-hole is configured at a first end to fit within the hole in the pocket and is accessible through the pocket. The adjustable fitting is configured at a second end to contact a structural mounting point. The adjustable fitting is rotatable within the hole in the pocket to bridge a gap between the saddle bracket and structural mounting point. A bolt is configured to fit through the through-hole in the adjustable fitting, wherein the adjustable fitting and bolt couple the saddled bracket to the structural mounting point.

Another illustrative embodiment provides an adjustable fitting comprising a first end configured to fit within a hole in a monument for an aircraft interior. A second end of the adjustable fitting comprises a planar surface configured to contact a structural mounting point. The fitting has a center through-hole configured to accommodate a bolt for coupling the monument to the structural mounting point. The fitting has a threaded exterior making it rotatable within the hole to bridge a gap between the monument and structural mounting point.

Another illustrative embodiment provides a method comprising inserting an adjustable fitting into a saddle bracket, wherein the saddle bracket comprises a recessed pocket with a hole. The adjustable fitting is configured at a first end to fit within the hole in the pocket and is accessible through the pocket. The adjustable fitting is configured at a second end to contact a structural mounting point. The saddle bracket is aligned with the structural mounting point, and the adjustable fitting it rotated within the hole in the pocket to bridge a gap between the saddle bracket and structural mounting point. A bolt is then inserted through a through-hole in the adjustable fitting and into the structural mounting point to couple the saddle bracket to the structural mounting point.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account different considerations. For example, the illustrative examples recognize and take into account that small gaps often exist between brackets on aircraft monuments and structural mounting points. These gaps are typically filled with a shim to ensure direct mechanical contact between the monument bracket and mounting point.

Figure 16:
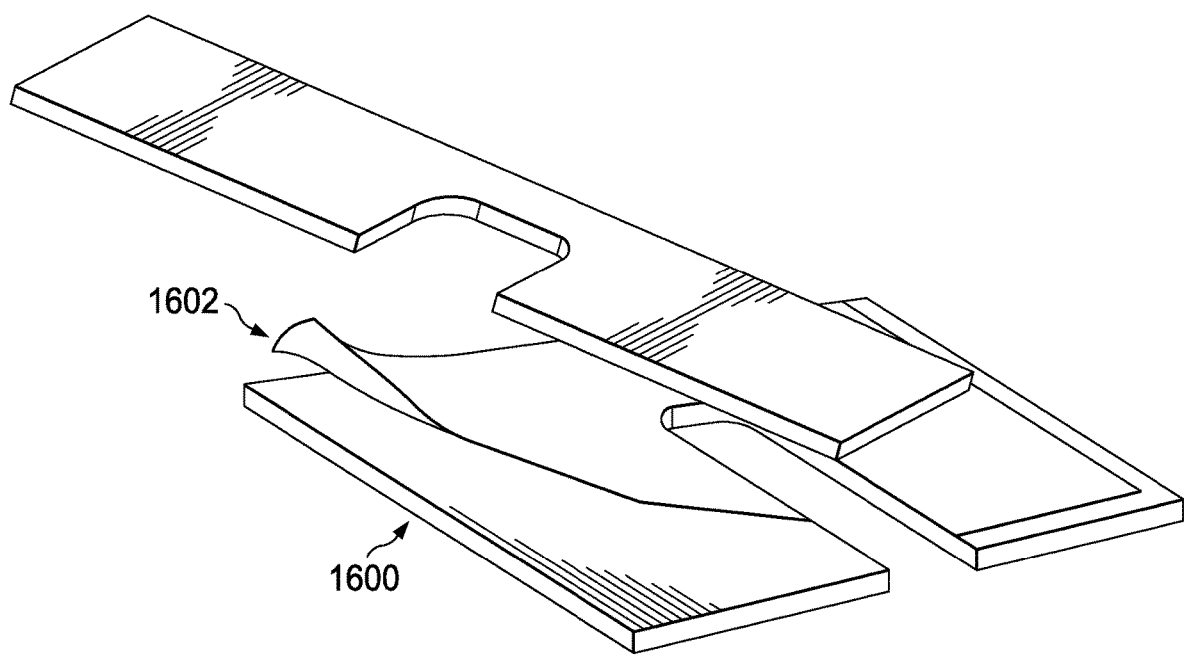
FIG. 16 illustrates a peelable shim in accordance with the prior art.

The illustrative embodiments also recognize and take into account that installing such shims is laborious, requiring the installer to get down on hands and knees to manually measure the gap, customize the shim to the gap, and manually install the shim. This process typically takes half an hour to an hour for each monument. The shims used typically are metal shims that can be peeled one layer at a time to adjust the thickness of the shim, as shown in FIG. 16. Illustrative embodiments obviate the need to use such shims, including the tedious and time-consuming process of peeling the shims layer by layer.

Thus, the illustrative examples provide a saddle bracket for use with aircraft monuments that has a threaded adjustable fitting. This fitting be dialed as necessary to close a gap between the saddle bracket and structural mounting point, thereby eliminating the need for a shim. The adjustable fitting is easily accessible through a pocket in the saddle bracket and can be rotated (dialed) using a spanner socket.

Figure 1:
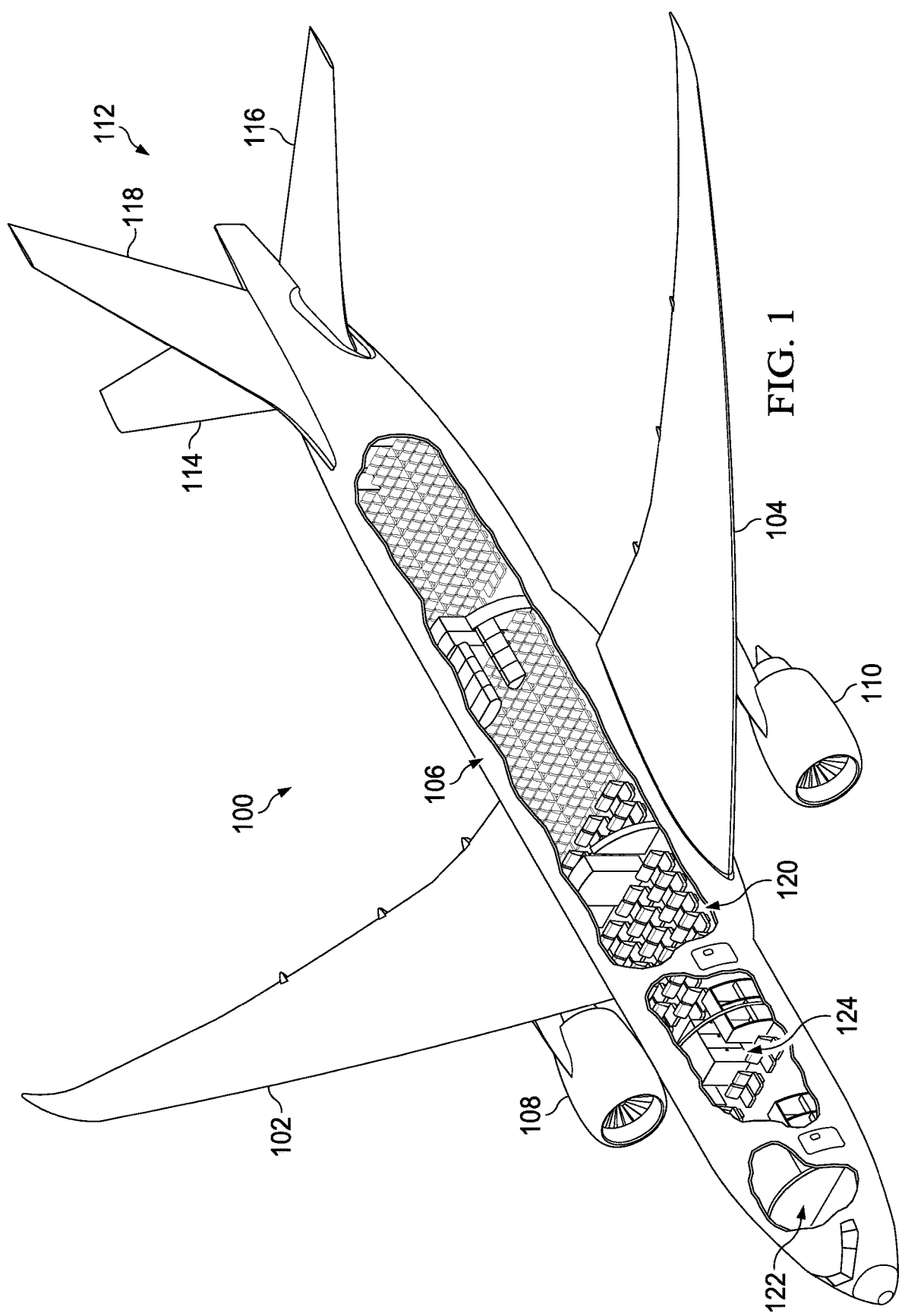
FIG. 1 is an illustration of a cut-away view of an aircraft in accordance with an illustrative example.

Referring now to the figures and, in particular, with reference to FIG. 1, an illustration of a cut-away view of an aircraft is depicted in accordance with an illustrative example. In this illustrative example, aircraft 100 includes wing 102 and wing 104 attached to fuselage 106.

Aircraft 100 also includes engine 108 attached to wing 102 and engine 110 attached to wing 104. Further, aircraft 100 includes tail section 112. Horizontal stabilizer 114, horizontal stabilizer 116, and vertical stabilizer 118 are attached to tail section 112.

In FIG. 1, a cutaway view of aircraft 100 is depicted such that passenger cabin 120, cockpit 122, and lavatories 124 may be seen.

Figure 2:
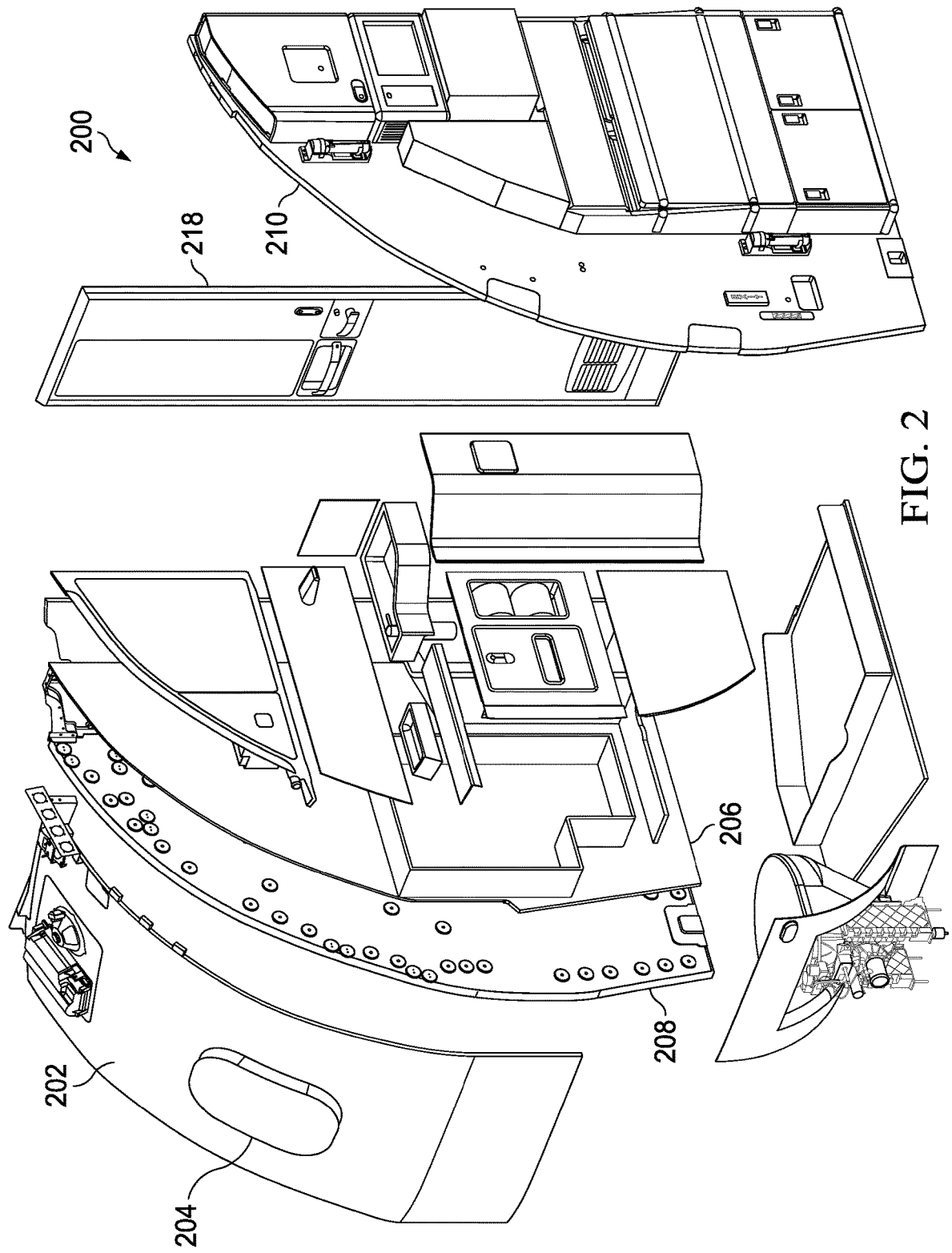
FIG. 2 is an illustration of an exploded view of an aircraft modular lavatory monument in accordance with an illustrative embodiment.

Turning now to FIG. 2, an exploded view of an aircraft modular lavatory monument is depicted in accordance with an illustrative embodiment. Aircraft lavatory 200 is an example of a moment with which the illustrative embodiments can be implemented. However, it should be noted that the illustrative embodiment can also be applied to other type of monuments such as galleys.

Aircraft lavatory monument 200 includes outboard wall 202 which is intended for removeable attachment to a fuselage of an aircraft and is an example of lavatory 124 in FIG. 1. Thus, outboard wall 202 may be considered part of a frame for aircraft lavatory monument 200. Optionally, aircraft lavatory monument 200 can be provided with window 204, which is placed, sized, and dimensioned to match a window in the corresponding model of aircraft.

Aircraft lavatory monument 200 also includes modular shell wall 206, which also forms part of the frame for the lavatory. Optionally, ballistic intrusion barrier 208 may also be provided, if desirable. In either case, the corresponding wall or barrier is removably attached to outboard wall 202 and radiates inwardly towards a central axis of the fuselage of the aircraft.

Lavatory monument 200 also includes aft wall 210. The term "aft" is used herein merely to distinguish shell wall 206 from modular aft wall 210. Aft wall 210 also forms part of the frame of the lavatory monument 200. Lavatory monument 200 also includes modular door 218, which is removably connected to one or both of modular shell wall 206 or modular aft wall 210

Figure 3:
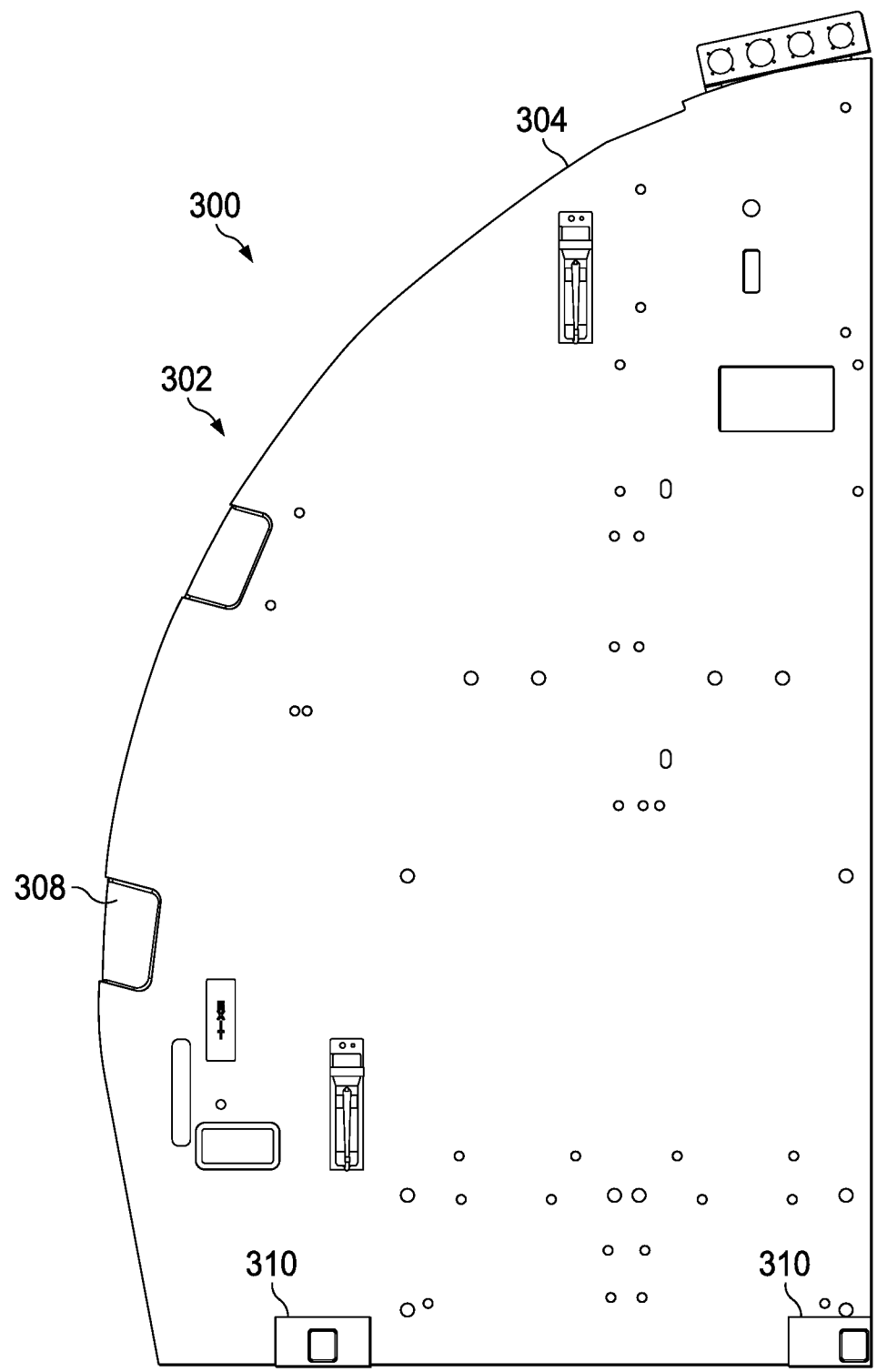
FIG. 3 is an illustration of an external side of an aft wall without non-lavatory features attached in accordance with an illustrative embodiment.

Turning now to FIG. 3, an illustration of an external side of an aft wall without non-lavatory features attached is depicted in accordance with an illustrative embodiment. Aft wall 300 can be aft wall 210 of FIG. 2. As depicted, aft wall 300 is an implementation of an aft wall adjacent an aircraft entry door. Aft wall 300 can comprise a composite sandwich panel.

Aft wall 300 has common curvature 302 for curved outboard edge 304 of aft wall 300. Curved outboard edge 304 is convex and mirrors a concave curvature of an outboard wall (not depicted). Aft wall 300 comprises aircraft door flaps 308, which allow aircraft door snubbers (not depicted) to pass through aft wall 300 when the aircraft entry door (not depicted) is opened. Aft wall 300 has a plurality of connection points comprising saddle brackets 310 on the base of aft wall 300.

Figure 4:
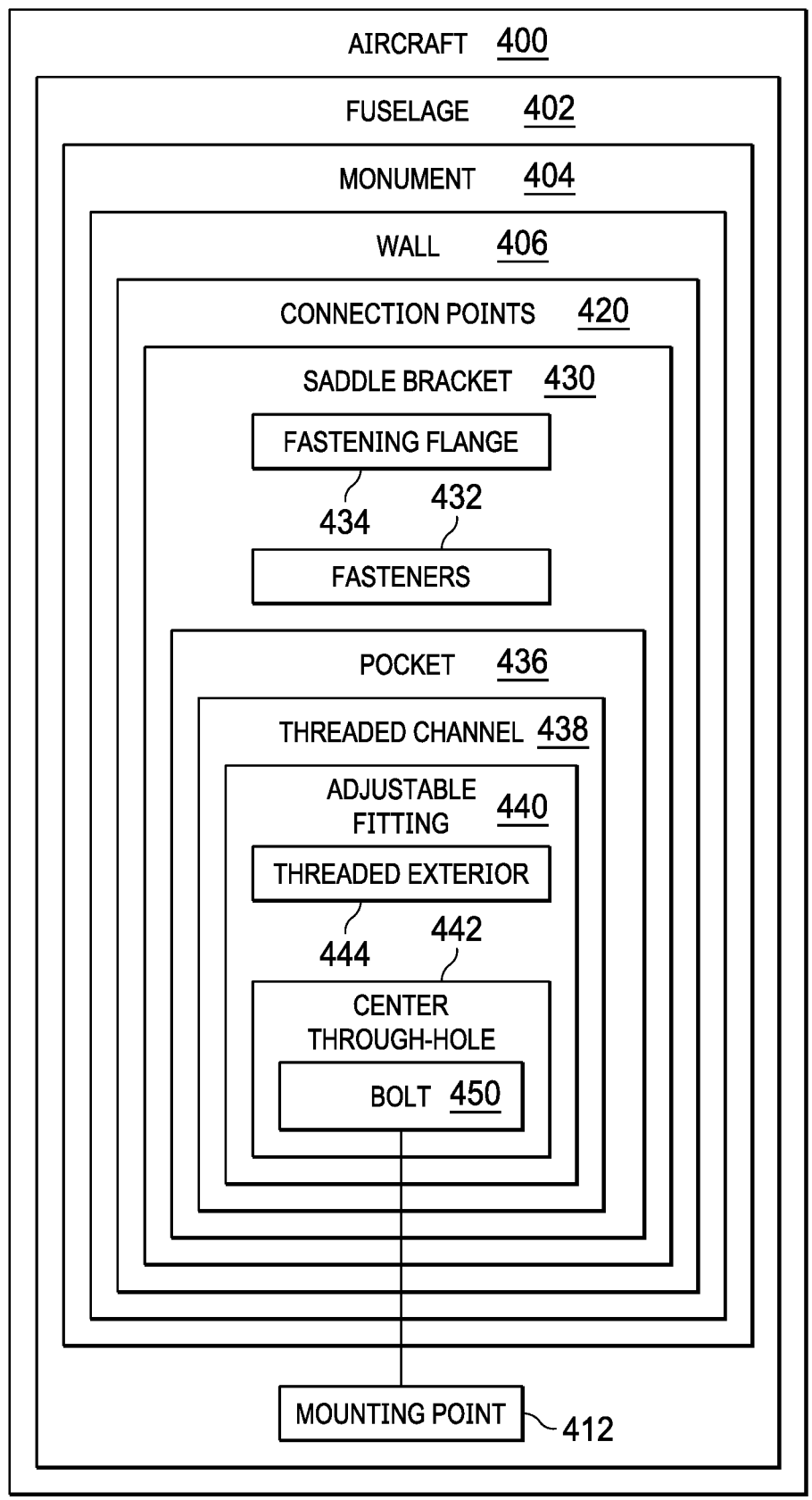
FIG. 4 is an illustration of a block diagram of a monument within an aircraft in accordance with an illustrative embodiment.

Turning now to FIG. 4, an illustration of a block diagram of a monument within an aircraft is depicted in accordance with an illustrative embodiment. Aircraft 400 comprises fuselage 402 and wall 406 of monument 404 within fuselage. Monument 404 can be a lavatory such as lavatory 200 shown in FIG. 2. Alternatively, monument 404 can another type of monument within aircraft 400 such as a galley. Aircraft 100 of FIG. 1 can be a physical implementation of aircraft 400. Wall 300 of FIG. 3 is an example physical implementation of wall 406.

Wall 406 has connection points 420 configured to join the wall 406 to the fuselage 402. Connection points 420 comprise metal saddle bracket 430 attached to wall 406.

Saddle bracket 430 comprises a fastening flange 434 and fasteners 432 for joining saddle bracket 430 to wall 406. Saddle bracket 430 also comprises a pocket 436 that has a threaded channel 438 in its floor. An adjustable fitting 440 is screwed into the threaded channel 438. The adjustable fitting 440 can be turned (dialed) within the threaded channel to extend more or less from the bottom of the saddle bracket 430 to bridge any gap between the bracket 430 and the structural mounting point 412 of the fuselage 402 to which the monument 404 is mounted. Bridging such a gap ensures that static force is transmitted between the saddle bracket 430 and structural mounting point 412 without the need to fill the gap with a shim.

The adjustable fitting 440 has a threaded exterior 444 for rotation (adjustment) within the threaded channel 438 of the pocket 436. The adjustable fitting also has center throughhole 442 into which a bolt 450 is inserted in order to secure the saddle bracket 430 to the structural mounting point 412.

The illustration in FIG. 4 is not meant to imply physical or architectural limitations to the manner in which an illustrative embodiment can be implemented. The blocks are presented to illustrate some functional components. One or more of these blocks can be combined, divided, or combined and divided into different blocks when implemented in an illustrative embodiment.

Figure 5:
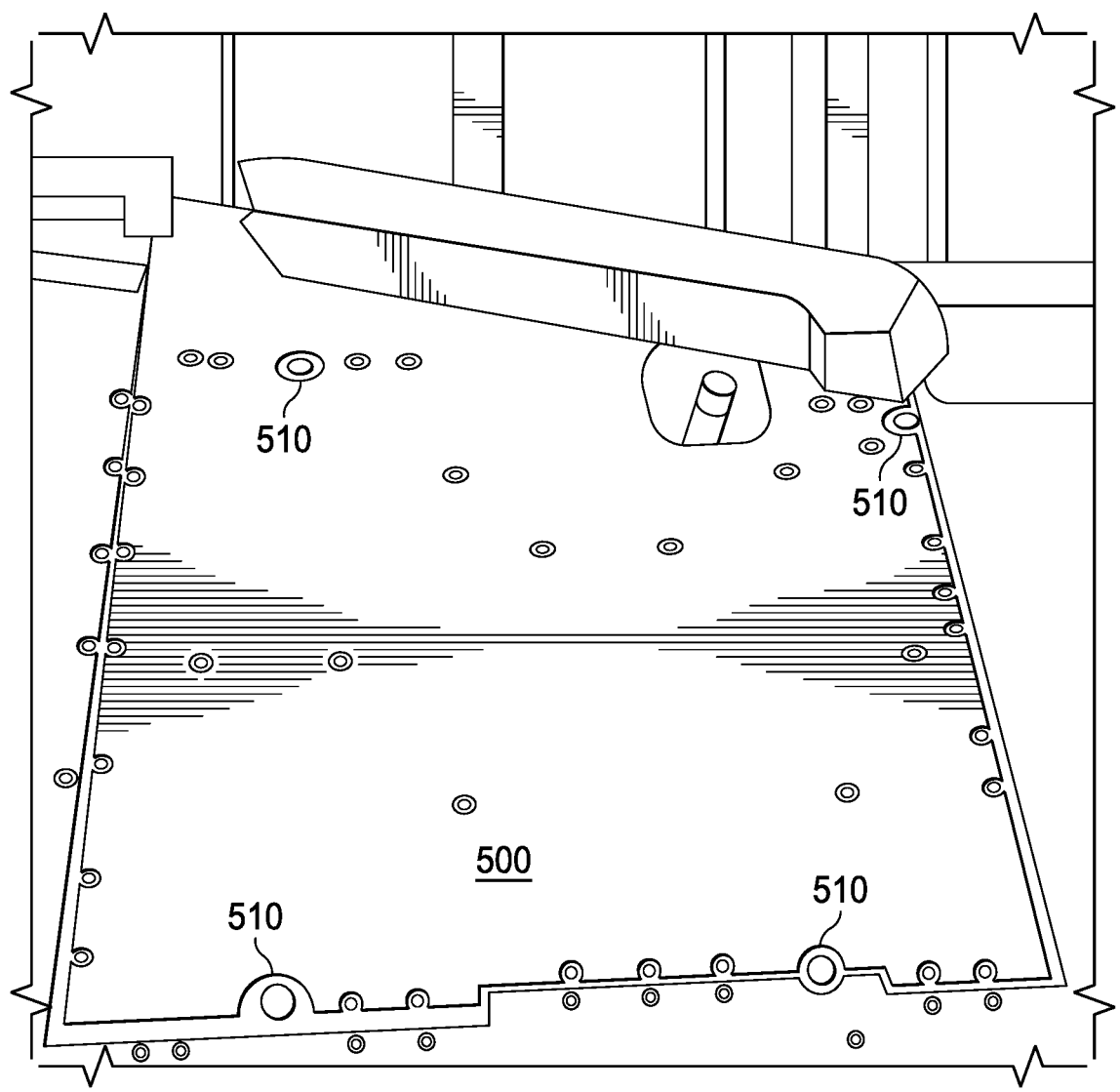
FIG. 5 illustrates a monument installation area in accordance with illustrative embodiments.

FIG. 5 illustrates a monument installation area in accordance with illustrative embodiments. Installation area 500 comprises a section of flooring in the interior of the aircraft over which a monument is to be installed. Within installation area 500 are several structural mounting points 510 to which saddle brackets of the monument will be coupled.

Figure 6:
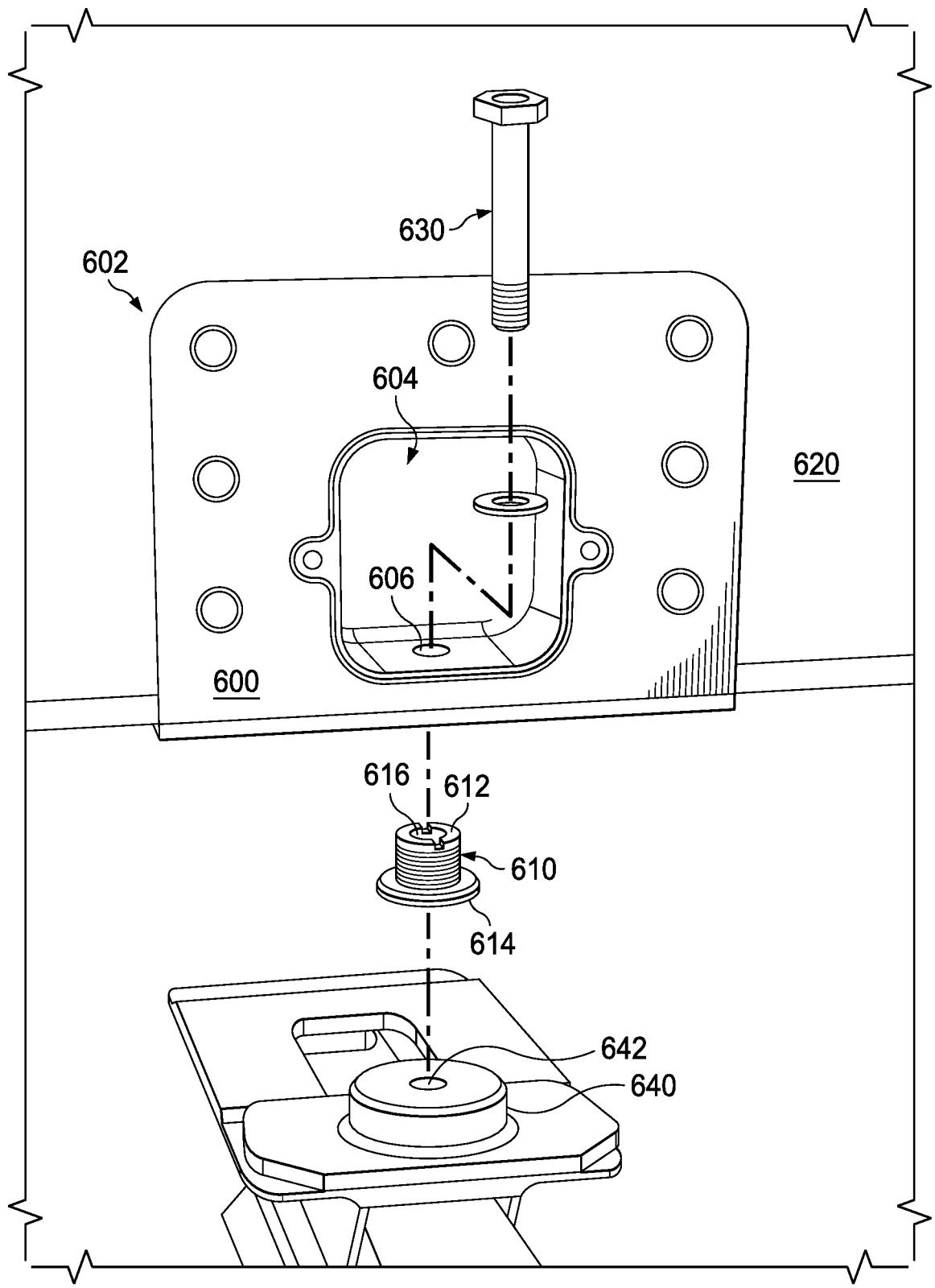
FIG. 6 depicts an exploded view of a saddle bracket assembly in accordance with an illustrative embodiment.

FIG. 6 depicts an exploded view of a saddle bracket assembly in accordance with an illustrative embodiment. Saddle bracket 600 comprises a fastening flange 602, which is secured to a monument wall 620 with screws or bolts (not shown). Wall 620 can be a composite sandwich panel such as wall 300 in FIG. 3. Saddle bracket 600 also comprises a recessed pocket 604 which allows installation of a securing bolt 630 through a hole 606 in the floor of the pocket 604.

Though not visible in this view, hole 606 is threaded to accommodate cylindrical adjustable fitting 610, which has a threaded exterior. The top end 612 of the adjustable fitting 610 is shaped to screw into hole 606 in the saddle bracket 600. The bottom end 614 of the adjustable fitting 610 has a planar surface designed to make contact with structural mounting point 640 and has a surface area substantially the same as the structural mounting point.

Adjustable fitting 610 also has a smooth through-hole 616 in its center, which allows the securing bolt to pass through pocket hole 606 and adjustable fitting 610 and insert into mounting hole 642 in the structural mounting point 640 when the monument is installed.

In the illustrative embodiment shown in FIG. 6, the fastening flange 602 is symmetrical around the pocket 604. This design is indicative of a saddle bracket positioned near the center of a wall base. For a corner bracket, the flange 602 can be positioned to one side of the pocket. The differences in design between center and corner brackets can be seen more clearly in FIG. 11. However, it should be emphasized that the features of the present disclosure are equally applicable to both design variations.

Figure 7:
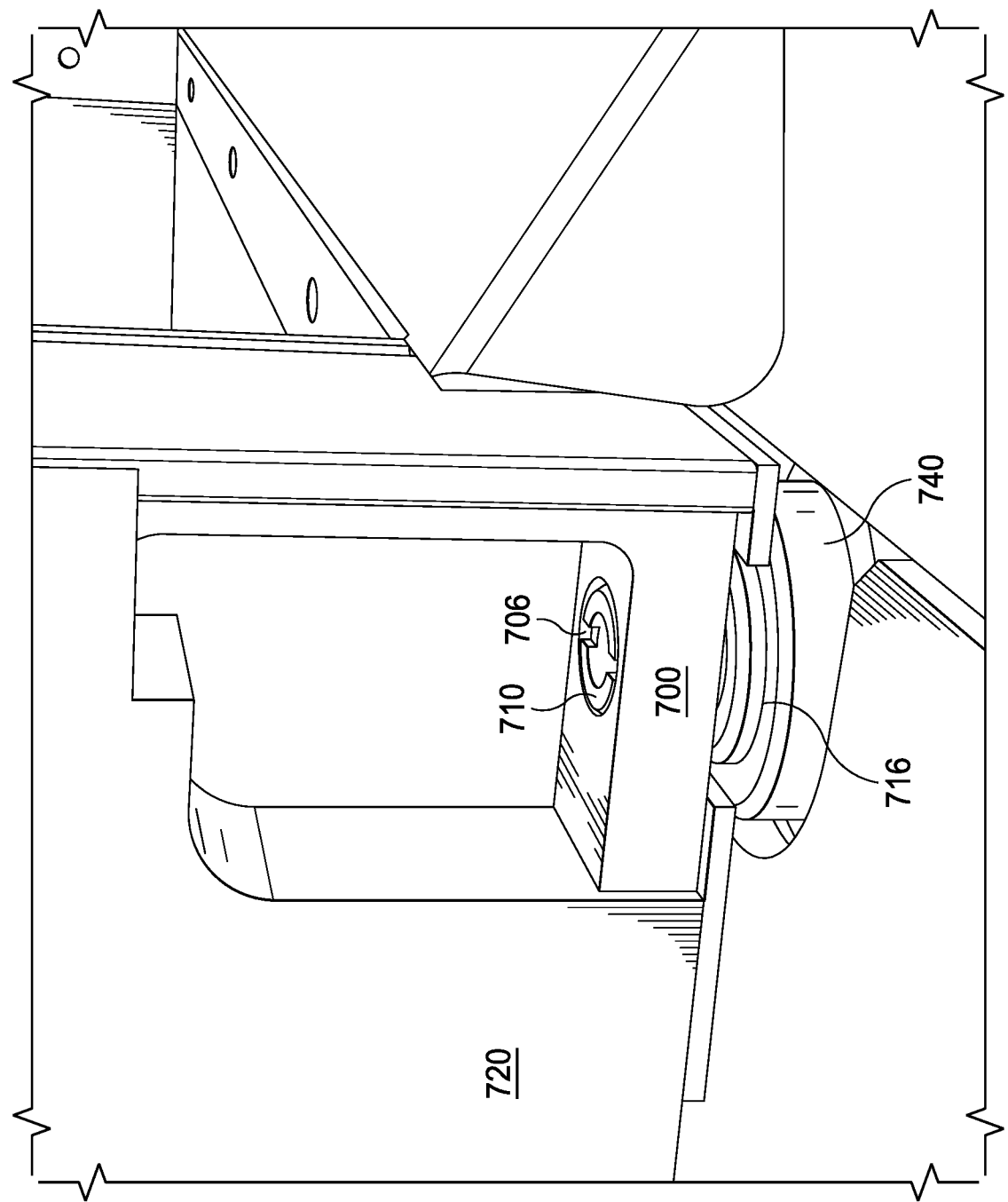
FIG. 7 depicts an adjustable fitting installed in a saddle bracket in accordance with an illustrative embodiment.

FIG. 7 depicts an adjustable fitting installed in a saddle bracket in accordance with an illustrative embodiment. In this example, saddle bracket 700 is located at the corner of monument wall 720. Adjustable fitting 710 has been screwed into pocket hole 706 of saddle bracket 700 and aligned over structural mounting point. After the saddle bracket 700 is positioned over the mounting point 740 there might be a small gap between the bottom 716 of the adjustable fitting 710 and the mounting point, requiring the adjusted fitting to be dialed (rotated) within the threaded pocket hole 706 in order to contact the structural mounting point 740 and bridge the gap between the bracket 700 and mounting point 740.

Figure 8:
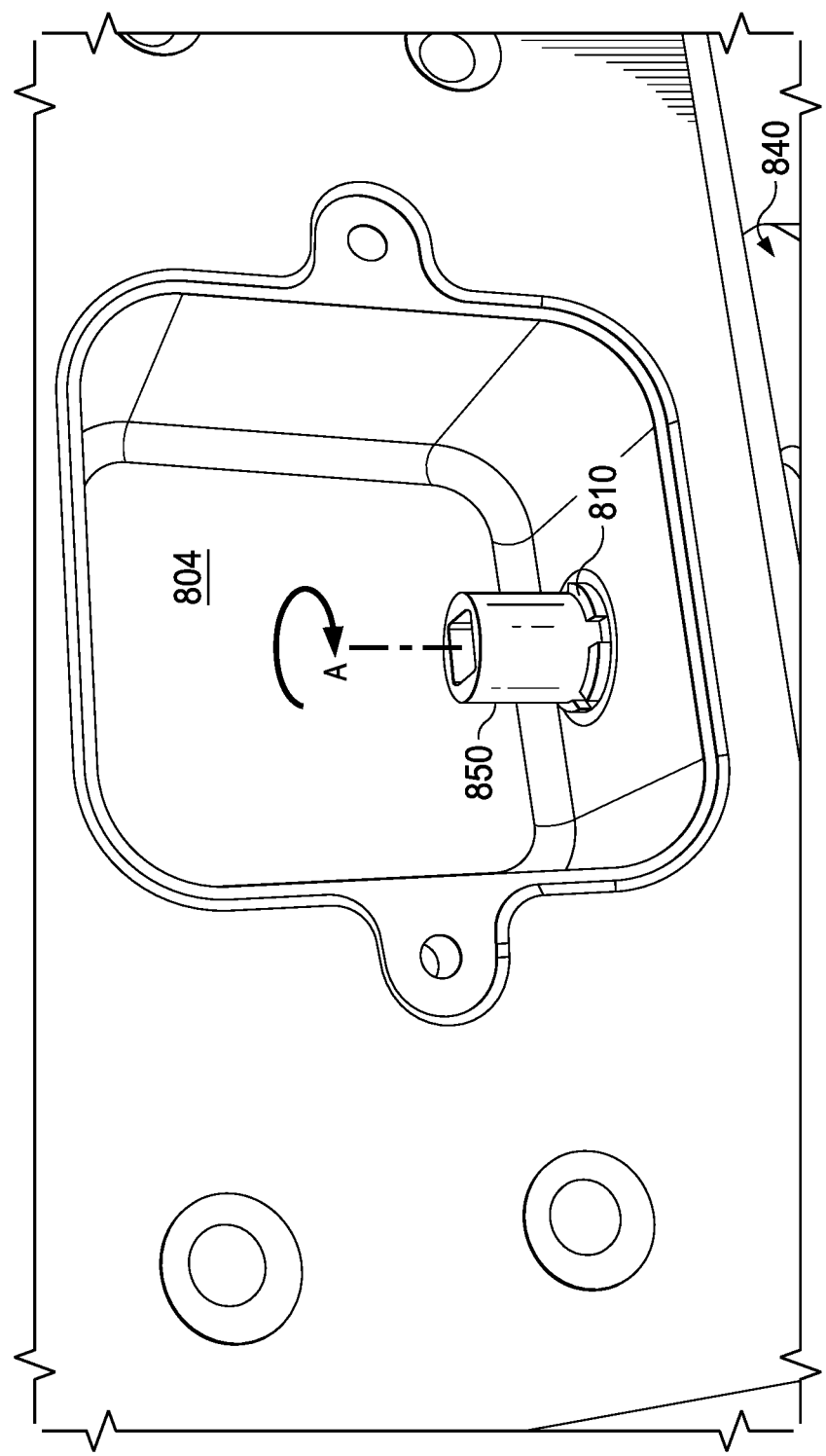
FIG. 8 illustrates how the adjustable fitting is dialed within the saddle bracket in accordance with an illustrative embodiment.
Figure 15:
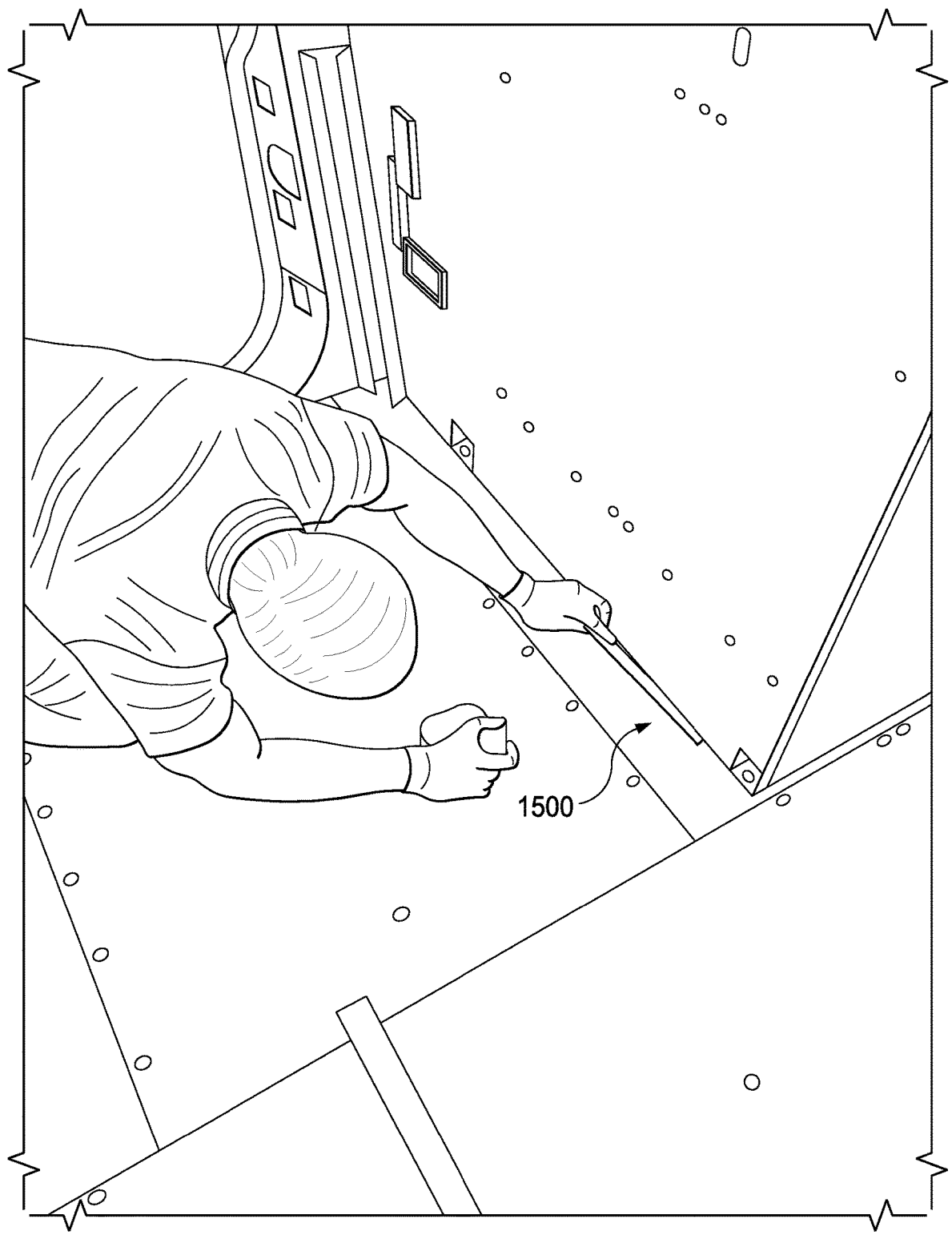
FIG. 15 illustrates a worker measuring and installing a shim under an aircraft monument in accordance with the prior art.

FIG. 8 illustrates how the adjustable fitting is dialed within the saddle bracket in accordance with an illustrative embodiment. The adjustable fitting 810 can be adjusted with a keyed tool such as spanner socket 850 that is shaped to mate with the adjustable fitting 810 as shown. By rotating the socket 850 in the direction of arrow A, the adjustable fitting 810 is dialed until it makes contact with the structural mounting point 840. FIG. 8 also illustrates how the recessed pocket 804 allows easy access for the spanner socket 850 to make the necessary adjustment of the fitting 810, in contrast to measuring the gap from below and installing a shim with poor mechanical advantage, as shown in FIG. 15. By allowing easy adjustment of the fitting 810 through the pocket 804 without having to stoop down to the plane of the gap to install the shim, the illustrative embodiments improve worker ergonomics in addition to reducing manufacturing time.

Figure 9:
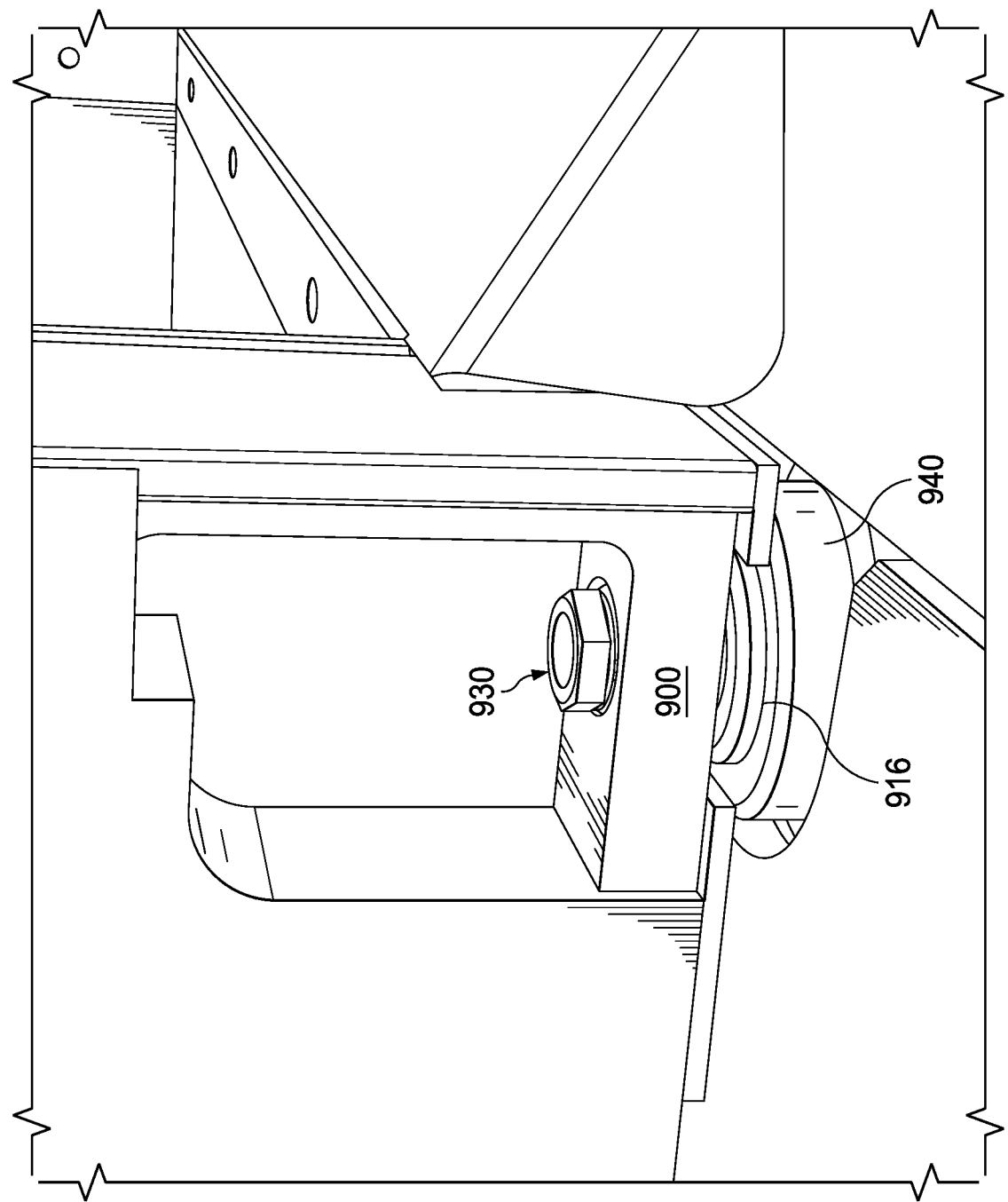
FIG. 9 shows a saddle bracket with a securing bolt in place in accordance with an illustrative embodiment.

FIG. 9 shows a saddle bracket with a securing bolt in place in accordance with an illustrative embodiment. After the bottom of the adjustable fitting 916 has been properly dialed to make contact with structural mounting point 940, a securing bolt 930 is inserted to couple the saddle bracket 900 to the mounting point 940.

Figure 10:
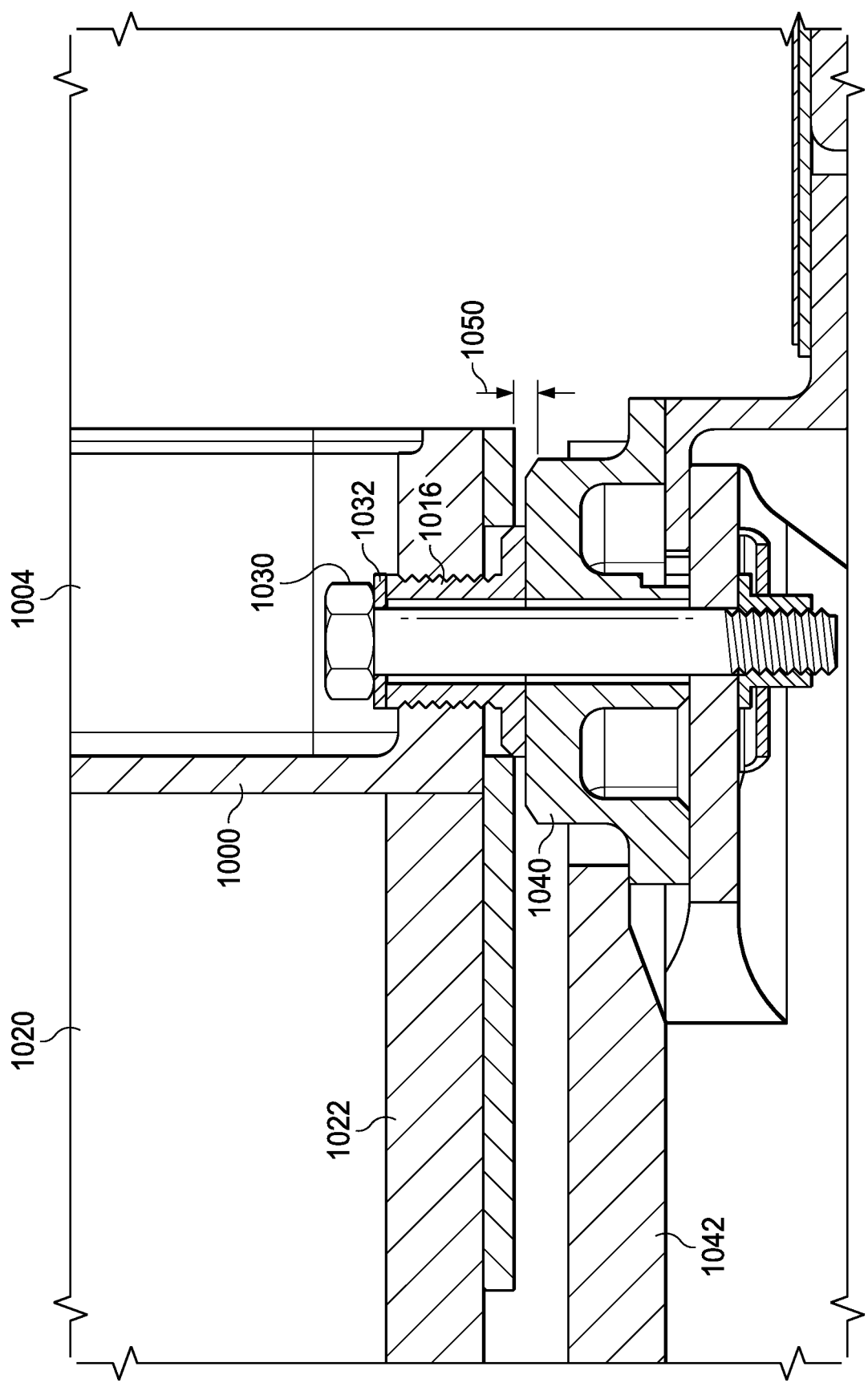
FIG. 10 is a cross-section view of an installed saddle bracket in accordance with an illustrative embodiment.

FIG. 10 is a cross-section view of an installed saddle bracket in accordance with an illustrative embodiment. In this view, the saddle bracket 1000 is installed in monument wall 1020. Securing bolt 1030 is inserted through the center of the adjustable fitting 1016 to secure the saddle bracket 1000 to the structural mounting point 1040. A washer 1032 is placed between the head of the bolt 1030 and the adjustable fitting 1016.

The bottom of the saddle bracket 1000 extends just below the bottom of the monument floor panel 1022, and the top of the mounting point 1040 extends just above the top of the aircraft floor panel 1042. In the example shown in FIG. 10, there is a small gap 1050 between the saddle bracket 1000 and the structural mounting point 1040. As shown in FIG. 10, instead of customizing and installing a shim as in FIGS. 15 and 16, the adjustable fitting 1016 is dialed down across gap 1050 to make contact with the top of the mounting point 1040. The dialing down of the adjustable fitting 1016 can be accomplished easily through recessed pocket 1004 before installing the securing bolt 1030.

Figure 11:
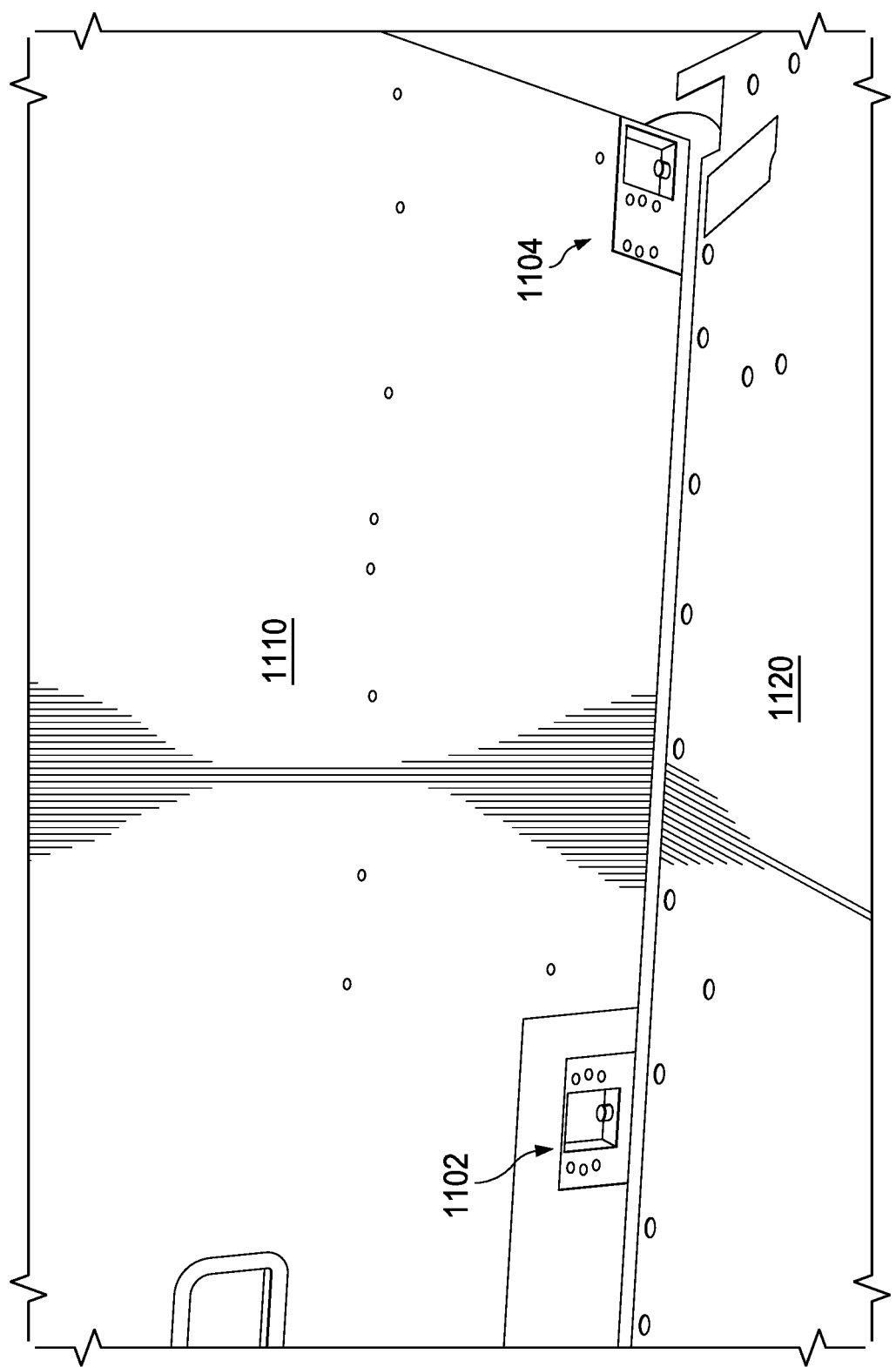
FIG. 11 illustrates an installed monument with saddle brackets in accordance with an illustrative embodiment.

FIG. 11 illustrates an installed monument with saddle brackets in accordance with an illustrative embodiment. This view shows monument 1110 after installation in aircraft interior 1120 is complete. FIG. 11 also illustrates the different flange configurations between outboard saddle bracket 1102 and inboard saddle bracket 1104, as explained above.

Figure 12:
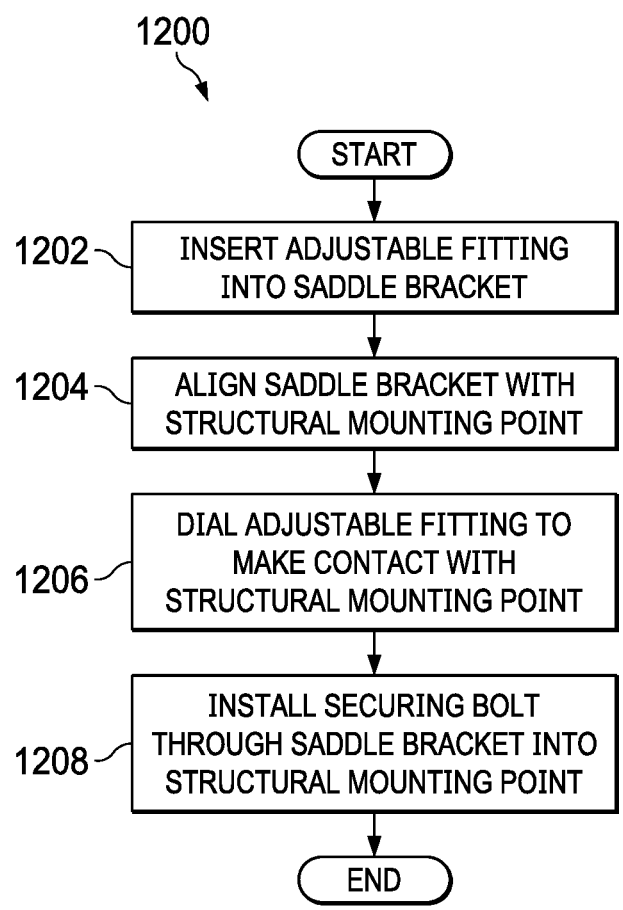
FIG. 12 illustrates a process flow for using a saddle bracket in accordance with illustrative embodiments.

FIG. 12 illustrates a process flow for using a saddle bracket in accordance with illustrative embodiments. Process 1200 begins by installing an adjustable fitting into a saddle bracket (step 1202). The saddle bracket is then aligned with a structural mounting point (step 1204).

After alignment, the adjustable fitting is dialed (rotated) until it makes contact with the structural mounting point (step 1206). A securing bolt is then inserted through the saddle bracket and adjustable fitting into the structural mounting point (step 1208).

Figure 13:
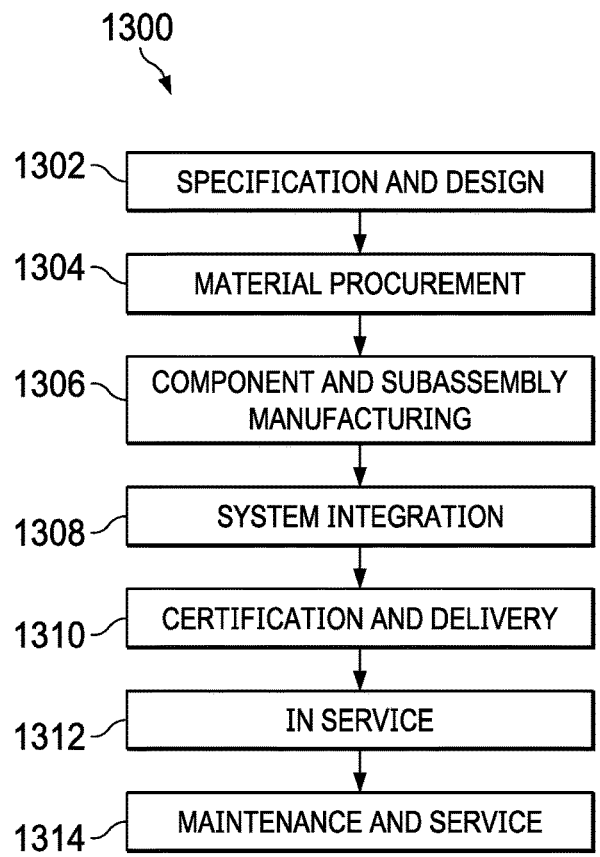
FIG. 13 is an illustration of an aircraft manufacturing and service method in the form of a block diagram in accordance with an illustrative example.
Figure 14:
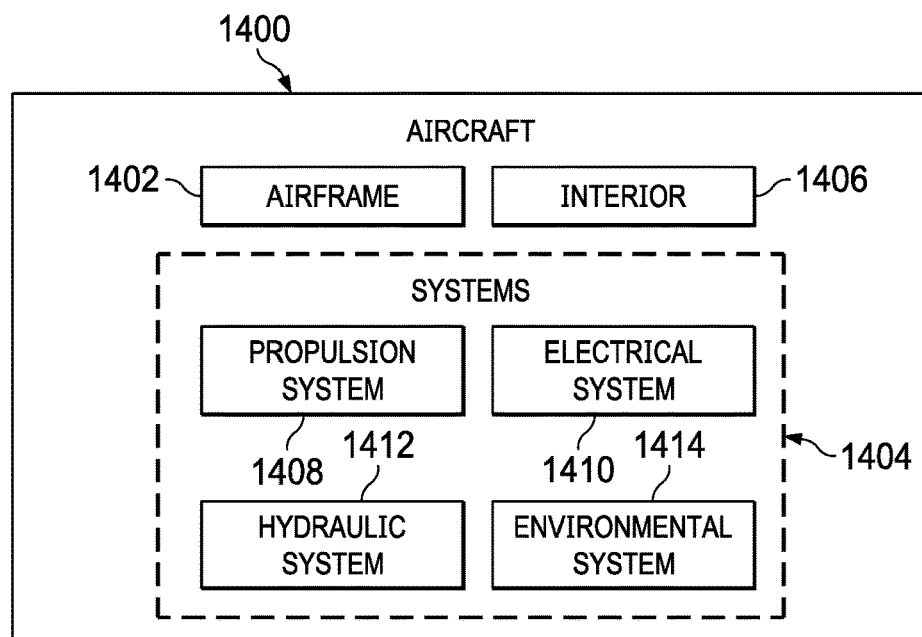
FIG. 14 is an illustration of an aircraft in the form of a block diagram in accordance with an illustrative example.

Illustrative examples of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative example. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative example may be implemented. In this example, aircraft 1400 is produced by aircraft manufacturing and service method 1300 in FIG. 13 and may include airframe 1402 with systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1300 in FIG. 13. In particular, lavatory 200 from FIG. 2 can be installed in or integrated as part of aircraft 1400 during any one of the stages of aircraft manufacturing and service method 1300. For example, without limitation, lavatory 200 can be installed in or integrated as part of aircraft 1400 during at least one of component and subassembly manufacturing 1306, system integration 1308, or some other stage of aircraft manufacturing and service method 1200.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus examples, method examples, or a combination thereof may be utilized during production stages, such as component and subassembly manufacturing 1306 and system integration 1308 in FIG. 13. One or more apparatus examples, method examples, or a combination thereof may be utilized while aircraft 1400 is in service 1312 and/or during maintenance and service 1314 in FIG. 13. The use of a number of the different illustrative examples may substantially expedite the assembly of and/or reduce the cost of aircraft 1400.

FIG. 15 illustrates a worker measuring and installing a shim under an aircraft monument in accordance with the prior art. In the prior method a feeler gauge 1500 is used to determine allowable gaps to shim.

FIG. 16 illustrates a peelable shim in accordance with the prior art. Shim 1600 is manually customized to each particular gap by peeling layers 1602 one at a time using a utility knife. Shim 1600 is typically made of titanium. In addition to the risk of cutting oneself with the utility knife while peeling the shim 1600, there is also the risk of being cut by the peeled layer 1602.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. As used herein, the term "substantially" or "approximately" when used with respect to measurements is determined by the ordinary artisan and is within acceptable engineering tolerances in the regulatory scheme for a given jurisdiction, such as but not limited to the Federal Aviation Administration Federal Aviation Regulations.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An adjustable mounting assembly, that comprises:
   a saddle bracket that comprises a pocket that comprises a threaded channel;
   an adjustable fitting that comprises a threaded exterior and a center through-hole, and is configured:
      at a first end to fit within the threaded channel in the pocket;
      to be accessed through the pocket;
      at a second end to contact a structural mounting point;
      to rotate within the threaded channel in the pocket and bridge a gap between the saddle bracket and the structural mounting point; and
   a bolt configured to fit through the center through-hole in the adjustable fitting, wherein the adjustable fitting and bolt couple the saddle bracket to the structural mounting point.

2. The adjustable mounting assembly of claim 1, wherein the center through-hole of the adjustable fitting is smooth.

3. The adjustable mounting assembly of claim 1, wherein the adjustable fitting further comprises a planar surface at the second end.

4. The adjustable mounting assembly of claim 1, further comprising a keyed tool configured to fit within the pocket of the saddle bracket and engage the first end of the adjustable fitting to rotate it within the threaded channel in the pocket.

5. The adjustable mounting assembly of claim 1, wherein the structural mounting point is part of an aircraft structure.

6. The adjustable mounting assembly of claim 1, wherein the saddle bracket is incorporated into a monument for an aircraft interior.

7. The adjustable mounting assembly of claim 1, wherein the saddle bracket is incorporated into a sandwich panel.

8. The adjustable mounting assembly of claim 7, wherein the saddle bracket further comprises a flange secured to the sandwich panel.

9. An adjustable fitting, that comprises:
   a first end configured to:
      fit within a hole in a monument for an aircraft interior; and
      configured to mate with a tool configured to rotate the adjustable fitting within the hole;
   a center through-hole configured to accommodate a bolt configured to couple the monument to a structural mounting point; and
   a threaded exterior, such that the adjustable fitting is configured to rotate within the hole and bridge a gap between the monument and the structural mounting point.

10. The adjustable fitting of claim 9, further comprising a second end that comprises a planar surface configured to contact the structural mounting point.

11. The adjustable fitting of claim 9, further comprising the first end configured to engage with a keyed tool.

12. The adjustable fitting of claim 9, further comprising the center through-hole being smooth.

13. A method, comprising:
   inserting an adjustable fitting into a saddle bracket comprising a pocket comprising a threaded channel, the adjustable fitting being configured:
      at a first end, to fit within the threaded channel in the pocket;
      to be accessed through the pocket; and
      at a second end, to contact a structural mounting point;
   aligning the saddle bracket with the structural mounting point;
   rotating the adjustable fitting within the threaded channel in the pocket to bridge a gap between the saddle bracket and structural mounting point; and
   inserting a bolt through a through-hole in the adjustable fitting and into the structural mounting point to couple the saddle bracket to the structural mounting point.

14. The method of claim 13, wherein the through-hole of the adjustable fitting is smooth.

15. The method of claim 13, wherein the adjustable fitting further comprises a planar surface at the second end.

16. The method of claim 13, wherein the adjustable fitting is rotated with a keyed tool configured to fit within the pocket of the saddle bracket and engage the first end of the adjustable fitting.

17. The method of claim 13, wherein the structural mounting point is part of an aircraft structure.

18. The method of claim 13, further comprising incorporating the saddle bracket into a monument for an aircraft interior.

19. The method of claim 13, further comprising incorporating the saddle bracket into a composite sandwich panel.

20. The method of claim 19, wherein the saddle bracket further comprises a flange secured to the composite sandwich panel.

\* \* \* \* \*